Figure 1:
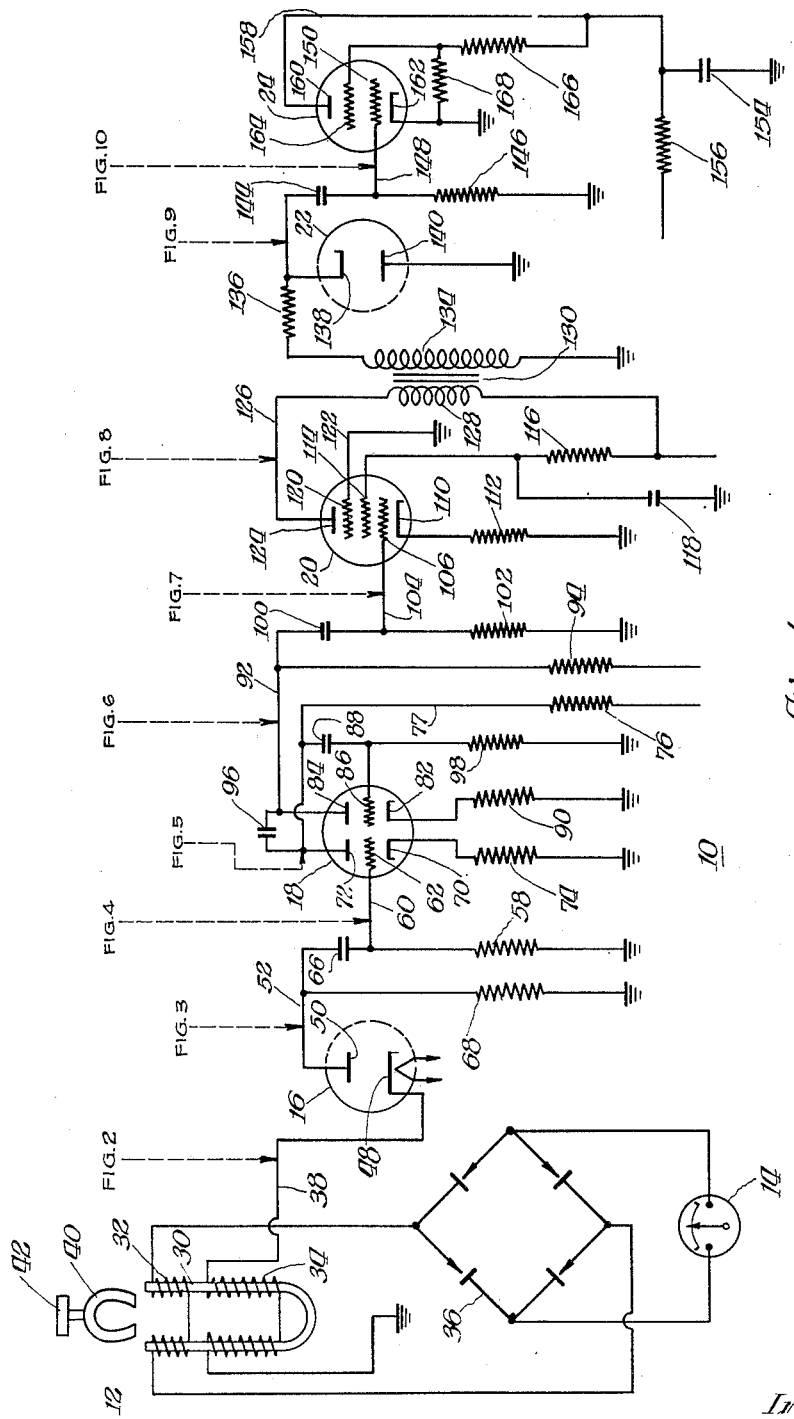

Sept. 5, 1950            A. C. ALLEN            2,521,141

ELECTRONIC CIRCUIT FOR TRIGGERING STROBOSCOPIC DEVICES

Filed Sept. 14, 1946            2 Sheets-Sheet 1

Inventor:
Arthur C. Allen
By:
Hinkle, Horton, Ahlberg, Hausmann & Napper
Attorneys.

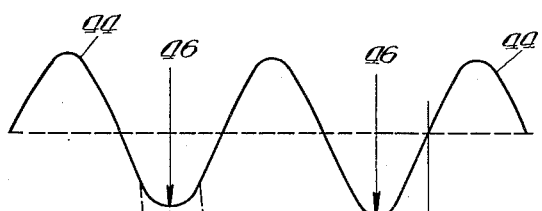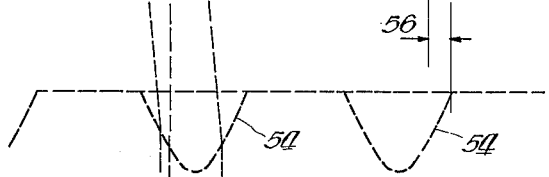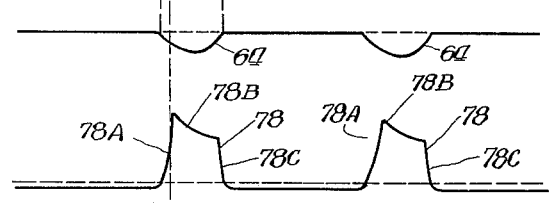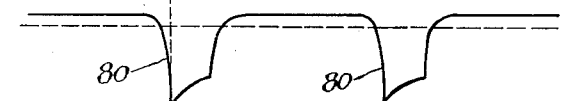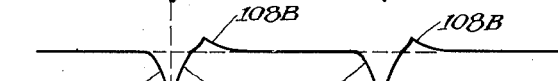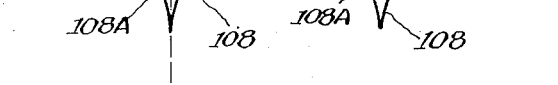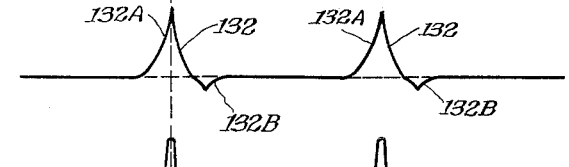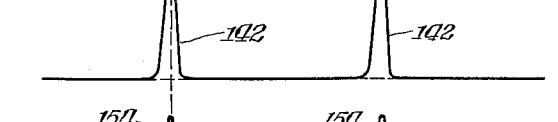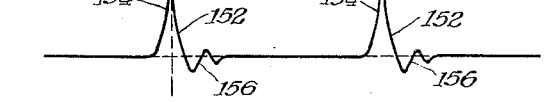

Patented Sept. 5, 1950

2,521,141

UNITED STATES PATENT OFFICE 2,521,141

ELECTRONIC CIRCUIT FOR TRIGGERING STROBOSCOPIC DEVICES

Arthur C. Allen, Chicago, Ill., assignor to Stewart-Warner Corporation, Chicago, Ill., a corporation of Virginia Application September 14, 1946, Serial No. 697,141

9 Claims. (Cl. 315—194)

The present invention relates to a new and improved electronic circuit and more particularly to a circuit adapted to modify an alternating current wave form so as to provide a single sharp peaked impulse and at a definite point in each cycle.

Circuits of the character to which the present invention pertains are useful for a number of purposes and especially in connection with apparatus for balancing wheels or other rotating bodies. Apparatus of this character comprises, essentially, means for locating the unbalance weight and determining its amount. It involves also a check of the rotating body after the application of corrective measures, such as the addition of a localized weight, to determine whether or not balance has been achieved.

In known types of apparatus, means engaging a support for the rotating body are provided to generate an alternating current having a definite phase relationship with the vibration of the support due to the unbalance of the rotating body, the amplitude of which is approximately proportional to the amount of the unbalance. The apparatus also includes an electronic circuit for modifying the alternating current wave form to produce a single sharp peak or impulse occurring once each cycle, which peak is utilized to trigger or fire a strobotron tube. Because of the known predetermined relationship of the time of firing of the tube relative to the direction of vibration of the unbalanced body at that time, the locus of the unbalance is determinable by visual observation. The approximate amount of unbalance is determined by the measurement of the amplitude of the current generated by the vibration.

The present invention has for its object the provision of a new and improved electronic circuit for producing a triggering or firing impulse in a definite and substantially unvarying phase relationship with respect to an alternating current wave form.

A further object of the invention is to provide a new and improved electronic circuit of the character aforesaid wherein the impulse is utilized to fire a strobotron tube.

A further object of the present invention is to provide a new and improved electronic circuit including means for obtaining a firing impulse substantially at the point of maximum amplitude of an alternating current wave irrespective of the actual amplitude of the wave.

Another object of the present invention is to provide a new and improved electronic circuit including a novel means for shifting the phase of a triggering or firing impulse relative to an alternating current wave in order that the impulse will occur substantially at the point of the maximum amplitude irrespective of the actual amplitude of the alternating current wave.

A further object of the present invention is to provide a new and improved electron circuit which will operate satisfactorily without "blocking" for high amplitude alternating current waves.

A still further object of the present invention is to provide a new and improved electron circuit including means for producing steep front impulses comprising an electron tube acting as a limiter.

Other objects and advantages of the present invention will become apparent from the ensuing description of an embodiment thereof, in the course of which reference is had to the accompanying drawings, in which:

Fig. 1 is a diagrammatic representation of one embodiment of the circuit of the invention; and Figs. 2 to 10, inclusive, are graphs of the wave forms appearing at various points in the circuit, as indicated in Fig. 1.

As shown in Fig. 1, the electron circuit 10 of the present invention includes a pick-up 12 for generating an alternating current in response to vibrations induced in a rotatig body by unbalance in the body. The alternating current generated by the pick-up 12 is supplied to the triggering pulse forming circuit and to an amplitude indicating meter 14. The pulse forming circuit includes a number of electron tubes 16, 18, 20 and 22, the functions and connections of which will be described hereinafter in greater detail and which control the firing of a strobotron 24.

The pick-up 12 may be of any suitable construction and is preferably of a type generating a relatively high voltage with a small excursion. As shown, diagrammatically, it includes a magnetic core 30 about which are wound a pair of coils 32 and 34, the former of which is connected to the meter through a full wave rectifier 36 and the latter of which is connected to the tube 16 through an input conducor 38. The pick-up 12 includes also a permanent magnet structure 40 movably mounted adjacent the core 30 and which is operatively connected to a member 42 maintained in contact with a vibrating member, which may be a wheel axle or brake back plate. The vibrations of the unbalanced rotating body thus move the magnet 40 from and toward the core 30, thereby to generate alternating currents in the two coils 32 and 34 having a frequency depending upon the periodicity of the vibrations and an amplitude proportional to the amplitude of the vibrations. More specifically, the amplitudes are proportional to the instantaneous velocity of the magnet 40. The details of the construction of the pick-up 12 form no part of the present invention and will not be further described herein; and, it may be constructed as disclosed in Patent No. 2,383,405.

The character of the voltage generated in the winding 34 of the pick-up 12 is depicted by the curve 44 of Fig. 2. When the apparatus is used in connection with the balance of a wheel, it is desired to fire the strobotron 24 and thereby furnish a flash of light at the instant when the voltage, and hence the velocity of the movable member (magnet 40), has a maximum negative value. These firing times are indicated by reference characters 46 in Fig. 2. The timing of the firing instant must be independent of the frequency and amplitude of the armature vibration within the practical limits of the operation of the device, and this is accomplished by the circuit of the present invention.

The alternating current voltage from the pickup 12 is supplied to the tube 16, which is preferably a section of a 6H6 tube, the other section of which is the previously referred to tube 22. The tube 16 operates as a half wave rectifier and it is connected preferably to be conductive only during the negative half cycles. Accordingly, its cathode 48 is connected to the input conductor 38 while its anode 50 is connected to an output conductor 52.

Theoretically, the output or anode voltage would have the form indicated by the curve 54 in Fig. 3, from which it may be noted that only the negative half cycles of the input voltage appear in the output circuit. It will be noted also that the output voltage lags the input voltage by a phase angle indicated by the reference character 56, also in Fig. 3. This lag results from the combination of the inductance of the pickup 12 and the resistance-capacitance network in the anode circuit of tube 16, to which reference will be had shortly, and this lag is made use of in obtaining the triggering impulses at the desired time. The components of this portion of the circuit are so proportioned that the phase lag is very nearly independent of the vibration frequency over the operating range of the apparatus which may be from about three to fifteen cycles per second.

The tube 16, in accordance with one of the important features of the present invention, is arranged so that only portions of the negative half cycles appear on the output or load resistor 58 which is connected by conductor 60 to the grid 62 of the first section of tube 18, which may be of the 6SL7 type. As a result of this arrangement the grid 62 is supplied with spaced apart voltage pulses 64 (see Fig. 4) which begin at substantially the firing instants 46.

The circuit for providing the pulses at substantially the firing instant includes not only the pick up 12 and the load resistor 58 but also the capacitor 66 connected between resistor 58 and the anode 50 of tube 16 and resistor 68 connected in parallel with the resistor 58 and capacitor 66, i. e., connected across the output of the rectifier. The circuit including the resistors 58 and 68 and capacitor 66 acts as a sort of automatic volume control so that only the tips or pulses in the region of the maximum amplitudes of the negative half cycles pass through to the tube 18, which is utilized primarily as a limiter or "peaking" tube.

The resistor 58 may have a value of about 150,000 ohms, the resistor 68 a value of about 3.3 megohms; the capacitor 60 may have a capacity of about .5 mfd. and the pick-up 12 may have an inductance of about 87 henries and a resistance of about 18 to 20 thousand ohms.

The circuit between the rectifier 16 and limiter tube 18 also serves, in accordance with another feature of this invention, the function of preventing the first section of the limiter tube 18 from becoming blocked by the building of a high negative potential upon its grid 62. Of the circuit elements, the capacitor 66 serves as a blocking condenser and the resistor 58 serves as a grid leak resistor and their values are such that the limiter tube does not become blocked.

A further feature of the invention is the utilization of the limiter tube 18 to produce sharp and limited voltage changes in the anode circuit of the first section of the tube, which section includes a cathode 70 and an anode 72 in addition to grid 62. The tube is normally biased by cathode resistor 74 (of about 2100 ohms) almost to cut-off and preferably so that it is driven to cut-off when the input signal has a low value—such as about ½ volt so that the limiter will be effective over a desired or normal range of generated voltage. As the grid 62 becomes more negative in response to the application of the more negative signal (as indicated by curve 64), less current flows through the tube. The voltage drop across the plate resistor 76 (connected to the plate by conductor 77 and having a value of about 220,000 ohms) thus decreases and the plate 72 becomes more positive, thereby to produce the signal pulses shown by curve 78 in Fig. 5. The plate voltage rises sharply as indicated by reference character 78A but is thereafter limited and decreases (as shown at portion 78B of the curve) because of the action of bias resistor 74. When the flow of current through the tube decreases as a result of the gradually increasing negative signal, the voltage drop across cathode resistor 74 decreases, with the result that the grid 62 becomes more positive relative to the cathode and returns to its initial potential. When the signal decreases the plate voltage also decreases, as shown by the portion 78C of the curve.

The signal pulses 78 are amplified by the second section of tube 18 to produce the pulses 80 shown in Fig. 6, which are quite like the pulses 78 but of greater magnitude and opposite phase. The second section of the tube 18 includes a cathode 82, an anode 84 and a grid 86 coupled to the plate 72 of the first section through a capacitor 88 (of about .5 mfd.) and the conductor 77. The cathode 82 is grounded through a bias resistor 90 (of about 6800 ohms) and the anode 84 is connected to a suitable source of anode voltage through conductor 92 and the plate resistor 94. The two anodes 72 and 84 are connected by a bypass capacitor 96 (of about .001 mfd.). A grid leak resistor 98 (of about 150,000 ohms) connects the grid 86 to ground.

The amplified negative pulses 80 are differentiated by a differentiating circuit including the series connected capacitor 100 (of about .04 mfd.) and resistor 102 (of about 3300 ohms), which are connected across the output circuit of the second section of tube 18. The capacitor 100 is connected to conductor 92 and the resistor is grounded. The output of the differentiating circuit is supplied by conductor 104, connected to the junction of the capacitor 100 and resistor 102, to the grid 106 of tube 20, which is utilized as an amplifier and may be of the 6SK7 type. The differentiated pulse is indicated by the reference character 108 in Fig. 7 and it may be seen to include the relatively sharp and large magnitude negative pulses 108A and the smaller positive pulses 108B.

The relatively sharp pulses 108 are amplified and inverted by the amplifier tube 20 which includes the previously referred to grid 106, and a cathode 110 connected to ground through bias resistor 112 (of about 500 ohms). The screen grid 114 is connected to a suitable source of potential through resistor 116 (of about 150,000 ohms) bypassed by a capacitor 118 (of about 8 mfd. and preferably of the electrolytic type). The suppressor grid 120 is connected to ground by conductor 122 and the anode 124 is connected to a suitable source of anode potential by conductor 126 and the primary winding 128 of a coupling and differentiating transformer 130, which is thus connected to the output or plate circuit of the tube 20.

The amplified pulses appearing in the plate circuit of tube 20 are shown by reference character 132 in Fig. 8. From this figure, it may be noted that the pulses consist of relatively high and sharp positive pulses 132A, and smaller and negative pulses 132B.

The differentiating and coupling transformer 130 is of the step-up type and has a step-up ratio of about 12 to 1. It includes a secondary winding 134, one terminal of which is preferably grounded and the other terminal of which is connected through resistor 136 (of about 47,000 ohms) to the rectifier 22, which eliminates the unwanted negative peaks. As previously indicated, the rectifier 22 is actually in the same tube envelope as the rectifier 16. It includes a cathode 138 connected to resistor 136 and an anode 140 connected to ground.

The voltage pulses appearing at the rectifier 22, i. e., across the cathode-anode circuit thereof are indicated by the reference character 142 in Fig. 9. These pulses are supplied to the strobotron 24 to fire it through a coupling circuit including a small capacitor 144 (of about 470 mmf.) and resistor 146 of about 1 megohm) connected in series with each other and parallel to the rectifier 22. The capacitor 144, which is preferably as small as possible and yet of a size to pass a sufficient impulse to the strobotron 24, serves to isolate the latter from the secondary winding 134, which would otherwise be conductively connected across the input. The junction of the capacitor and resistor is connected by conductor 148 to the control grid 150 of the strobotron 24. The coupling circuit modifies the pulses 142 somewhat to produce the pulses indicated by reference character 152 in Fig. 10, which may be noted to consist of the relatively high positive pulses 154 and the small negative pulses 156. The strobotron 24 is fired by the larger positive pulses.

Each time the strobotron tube is fired or rendered conductive a capacitor 154 (of about 4 mfd.), which is normally charged through a resistor 156 (of about 10,000 ohms) connected to a suitable source of potential is discharged through the tube 24. The discharge occurs through a circuit including conductor 158, the anode 160 and the cathode 162 of the strobotron 24. The shield grid 164 of the strobotron 24 is supplied with suitable potential by a voltage divider including the resistors 166 (of about 56,000 ohms) and 168 (of about 22,000 ohms), to the junction of which the grid 164 is connected.

When it is desired to use the apparatus of the present invention in connection with balancing a rotating body the magnet holding member 42 is placed into contact with a member vibrated in response to the unbalance of the rotating body. For example, the member 42 may be maintained in contact with a wheel axle or the back plate of a brake so that the magnet 40 is moved in response to the vibrations to generate an alternating current having a sinusoidal wave form, as illustrated by reference character 44 in Fig. 2. In the succeeding portion of the description of the operation it is assumed that the input voltage thus applied to the cathode 48 of the rectifier 16 has a value of about 5 volts. This magnitude is readable upon the meter 14 which thus gives an indication of the amount of the unbalance.

The rectifier 16 and the modifying circuit including the resistors 58 and 68 and the capacitor 66 produce modified impulses 64 beginning substantially at the time the amplitude is a maximum, i. e., at the instant 46 when it is desired to fire the strobotron 24. The amplitude of these pulses, with a 5 volt input signal, is about .95 volt and the impulse is negative.

The negative pulses are limited by the first section of tube 18 to produce the pulses 78 illustrated in Fig. 5, which have an amplitude of about 18 volts. These pulses are amplified by the second section of tube 18 to provide the pulses 80 illustrated in Fig. 6 having an amplitude of about 105 volts. The pulses 80 are differentiated by the circuit 100 and 102 to produce the pulses 108, of which the negative portions have values of about 4 volts and the positive portions of which have a positive value of about 1.5 volts. The sharp pulses 108 are amplified by the tube 20 to produce the pulses 132 of which the positive portions have amplitudes of about 45 volts and the negative portions of about 11 volts.

The pulses 132 are differentiated by the transformer 130 and the negative portions are removed by the rectifier 22. The resulting positive pulses 142 have amplitudes of about 105 volts.

The positive pulses are supplied to the control grid 150 of the strobotron 24 through the coupling circuit 144, 146, which modifies the pulses somewhat to produce the pulses 152 of Fig. 10, of which the positive portions 154 have values of about 32 volts and the negative portions 156 of about 16 volts for the assumed input voltage.

Each time the strobotron is supplied with one of the pulses 152, which occurs at substantially the point of maximum amplitude of the generated wave, it is fired, thereby to illuminate the rotating body. By observing the apparent position of the rotating body, it is possible to determine the locus of unbalance in known manner and to correct the unbalance by the addition of a suitably located weight.

It should be understood that while but a single embodiment of the invention has been disclosed and described in detail that the details thereof are not intended to be limitative of the invention, except in so far as set forth in the accompanying claims.

Having thus described my invention, what I claim as new and desire to obtain by Letters Patent is:

1. In an electronic circuit for triggering a stroboscopic device in definite phase relation with an alternating current, the combination including, means including rectifying means supplied with the alternating current and energy storage means coupled thereto for providing current pulses of one polarity and occurring at the regions of maximum amplitude of said current, a stroboscopic device, and means including a peaking tube and limiting circuit, a first amplification and differentiation stage coupled to said tube, a second amplification and differentiation stage coupled to said first stage, said means coupled to said rectifying means for supplying a triggering impulse to the stroboscopic device for each of said current pulses.

2. In an electronic circuit for triggering a stroboscopic device in definite phase relation with an alternating current, the combination including, means including a rectifier supplied with the alternating current and passing only maximum amplitude portions of one polarity for providing current pulses of one polarity occurring at the regions of maximum amplitude of said current, a stroboscopic device, and means including a peaking tube and limiting circuit, a first amplification and differentiation stage coupled to said tube, a second amplification and differentiation stage coupled to said first stage, said means coupled to said rectifying means for supplying a triggering impulse to the stroboscopic device for each of said current pulses.

3. In an electronic circuit for triggering a stroboscopic device in definite phase relation with an alternating current, the combination including, rectifying means supplied with the alternating current, and phase shifting means connected to said rectifying means for supplying current pulses of the one polarity at the regions of the maximum amplitude thereof, a stroboscopic device, and means including a peaking tube and limiting circuit, a first amplification and differentiation stage coupled to said tube, a second amplification and differentiation stage coupled to said first stage, said means coupled to said phase shifting means for supplying a triggering impulse to the stroboscopic device for each of said current pulses.

4. In an electronic circuit for triggering a stroboscopic device in definite phase relation with an alternating current, the combination including, rectifying means including a rectifier tube supplied with the alternating current for providing current of one polarity, means coupled to said rectifying means for supplying current pulses of the said one polarity at the region of the maximum amplitudes thereof, said means including a series connected capacitor and resistor connected across said rectifier tube and a second resistor also connected across said tube, a stroboscopic device, and means including a peaking tube and limiting circuit, a first amplification and differentiation stage coupled to said tube, a second amplification and differentiation stage coupled to said first stage, said means coupled to the junction of said capacitor and first-mentioned resistor for supplying a triggering impulse to the stroboscopic device for each of said current pulses.

5. In an electronic circuit for triggering a stroboscopic device in definite phase relation with an alternating current, the combination including, rectifying means supplied with the alternating current for providing current of one polarity, a stroboscopic device, and means including a limiter, a peaking tube, a first amplification and differentiation stage coupled to said tube, a second amplification and differentiation stage coupled to said first stage, and a coupling means between said rectifying means and said limiter including a capacitor acting as a blocking condenser and a resistor acting as a grid leak resistor connected to said tube for supplying a triggering impulse to the stroboscopic device for each of said current pulses.

6. In an electronic circuit for triggering a stroboscopic device in definite phase relation with an alternating current, the combination including, means including rectifying means supplied with the alternating current for supplying negative current pulses at the regions of the maximum amplitude of said one polarity of said alternating current thereof, a stroboscopic device, and means including a peaking tube and limiting circuit, a first amplification and differentiation stage coupled to said tube, a second amplification and differentiation stage coupled to said first stage, said means coupled to said rectifying means for supplying triggering impulses to the stroboscopic device for each cycle of the alternating current and in definite phase relation thereto, said last-mentioned means including an electron tube having a cathode, a control electrode and a cathode bias resistor normally biasing the tube almost to cut off for limiting the resulting voltage changes.

7. In an electronic circuit for triggering a stroboscopic device in definite phase relation with an alternating current, the combination including, rectifying means supplied with the alternating current for providing negative current pulses, means associated with said rectifying means for supplying negative current pulses at the negative maximum amplitude regions of the alternating current, means coupled to said last-mentioned means including an electron tube having a cathode, a control electrode and a cathode bias resistor for limiting the resulting voltage changes, a stroboscopic device, and means including a first amplifying and differentiating stage coupled to said tube and a second amplifying and differentiating stage coupled to said first stage for supplying a triggering impulse to the stroboscopic device for each cycle of said alternating current.

8. In an electronic circuit for triggering a stroboscopic device in definite phase relation with an alternating current, the combination including, a rectifier tube supplied with the alternating current for providing negative current pulses, means associated with said rectifying means including resistance and capacitance means for supplying negative current pulses at the regions of the maximum amplitude of said pulses, means coupled to said last-mentioned means including an electron tube having a cathode, a control electrode and a cathode bias resistor for limiting the resulting voltage changes, a stroboscopic device, and means including a first amplifying and differentiating stage coupled to said tube and a second amplifying and differentiating stage coupled to said first stage for supplying a triggering impulse to the stroboscopic device for each cycle of said alternating current.

9. In an electronic circuit for triggering a stroboscopic device in definite phase relation with an alternating current, the combination including, means including rectifying and phase shifting means supplied with the alternating current for providing current pulses of one polarity and occurring at the regions of maximum negative amplitude of the alternating current, a stroboscopic device, and means including a peaking tube and limiting circuit, a first amplification and differentiation stage coupled to said tube, a second amplification and differentiation stage coupled to said first stage, said means coupled to said rectifying means for supplying triggering impulses to the stroboscopic device for each of said current pulses.

ARTHUR C. ALLEN.

REFERENCES CITED

The following references are of record in the file of this patent:

UNITED STATES PATENTS

| Number | Name | Date |
|---|---|---|
| 2,306,791 | Moe | Dec. 29, 1929 |
| 2,449,651 | Hathaway | Sept. 21, 1948 |